(12) United States Patent
Graf Von Bismarck

(10) Patent No.: US 8,469,374 B2
(45) Date of Patent: Jun. 25, 2013

(54) SUITCASE WITH EXTENSIBLE STEERING WHEELS

(75) Inventor: Gregor Graf Von Bismarck, Friedrichsruh (DE)

(73) Assignee: Resint NV, Curacao (AN)

( * ) Notice: Subject to any disclaimer, the term of this patent is extended or adjusted under 35 U.S.C. 154(b) by 617 days.

(21) Appl. No.: 12/518,366

(22) PCT Filed: Dec. 14, 2007

(86) PCT No.: PCT/EP2007/063994
§ 371 (c)(1),
(2), (4) Date: Oct. 20, 2009

(87) PCT Pub. No.: WO2008/071798
PCT Pub. Date: Jun. 19, 2008

(65) Prior Publication Data
US 2010/0044174 A1    Feb. 25, 2010

(30) Foreign Application Priority Data

Dec. 15, 2006 (IT) .............................. MI2006A2409

(51) Int. Cl.
*B62B 1/04* (2006.01)
*B62M 1/00* (2010.01)

(52) U.S. Cl.
USPC ........ 280/47.26; 280/37; 280/30; 280/87.041

(58) Field of Classification Search
USPC ................. 280/47.131, 47.17, 47.18, 47.26, 280/47.371, 87.021, 87.041, 87.05, 304.5, 280/37, 30; 190/15.1, 18 A; 224/153
See application file for complete search history.

(56) References Cited

U.S. PATENT DOCUMENTS

| 3,314,494 | A  | * | 4/1967  | Weitzner ...................... 180/208 |
| 4,076,266 | A  | * | 2/1978  | Krausz ..................... 280/87.042 |
| 4,145,065 | A  | * | 3/1979  | Kupka ..................... 280/87.041 |
| 5,820,146 | A  | * | 10/1998 | Van Ligten .............. 280/87.041 |
| 6,460,866 | B1 | * | 10/2002 | Altschul et al. ................. 280/30 |

(Continued)

FOREIGN PATENT DOCUMENTS

| FR | 2 849 751 | 7/2004 |
| NL | 1018053 | 11/2002 |
| WO | 01/72164 | 10/2001 |

OTHER PUBLICATIONS

International Search Report mailed Apr. 21, 2008 for International Application No. PCT/EP2007/063994.

(Continued)

*Primary Examiner* — Katy M Ebner
*Assistant Examiner* — Emma K Frick
(74) *Attorney, Agent, or Firm* — Wenderoth, Lind & Ponack, L.L.P.

(57) ABSTRACT

A suitcase has a pair of wheels installed at one side of a body of the suitcase and a handlebar projecting from the body of the suitcase on a side opposite where the wheels are installed and a board movable between a rest position drawn near the suitcase body and an operative position projecting from the suitcase body to hold up a suitcase user with the wheels installed on the suitcase body being steering and there being a kinematic connection between the handlebar and the wheels to control the steering. The steering wheels are movable between a retracted position near the suitcase body and an operative position extended far from the suitcase body.

18 Claims, 4 Drawing Sheets

U.S. PATENT DOCUMENTS

| | | | | |
|---|---|---|---|---|
| 6,604,615 B2 * | 8/2003 | Wu | | 190/18 A |
| 6,651,993 B1 * | 11/2003 | Emerzian et al. | | 280/47.34 |
| 6,688,614 B2 * | 2/2004 | Hsu | | 280/37 |
| 6,802,409 B1 * | 10/2004 | Tiramani et al. | | 190/18 A |
| 7,014,020 B2 * | 3/2006 | Tamura | | 190/15.1 |
| 7,029,015 B2 * | 4/2006 | Lin | | 280/47.26 |
| 7,461,715 B1 * | 12/2008 | Tsai | | 180/208 |
| 7,731,204 B2 * | 6/2010 | Turner et al. | | 280/30 |
| 7,837,206 B1 * | 11/2010 | Lee | | 280/37 |
| 2003/0042711 A1 * | 3/2003 | Hsu | | 280/651 |
| 2004/0056442 A1 * | 3/2004 | Ostrowski et al. | | 280/87.041 |
| 2004/0094919 A1 * | 5/2004 | Roder et al. | | 280/30 |
| 2011/0155527 A1 * | 6/2011 | Veal et al. | | 190/18 A |
| 2011/0193304 A1 * | 8/2011 | Turner et al. | | 280/37 |
| 2011/0214957 A1 * | 9/2011 | Barnard et al. | | 190/15.1 |
| 2012/0013089 A1 * | 1/2012 | Reeves | | 280/47.26 |

OTHER PUBLICATIONS

International Preliminary Report on Patentability mailed Apr. 1, 2009 for International Application No. PCT/EP2007/063994.

Written Opinion of the International Searching Authority on Patentability mailed Apr. 1, 2009 for International Application No. PCT/EP2007/063994.

* cited by examiner

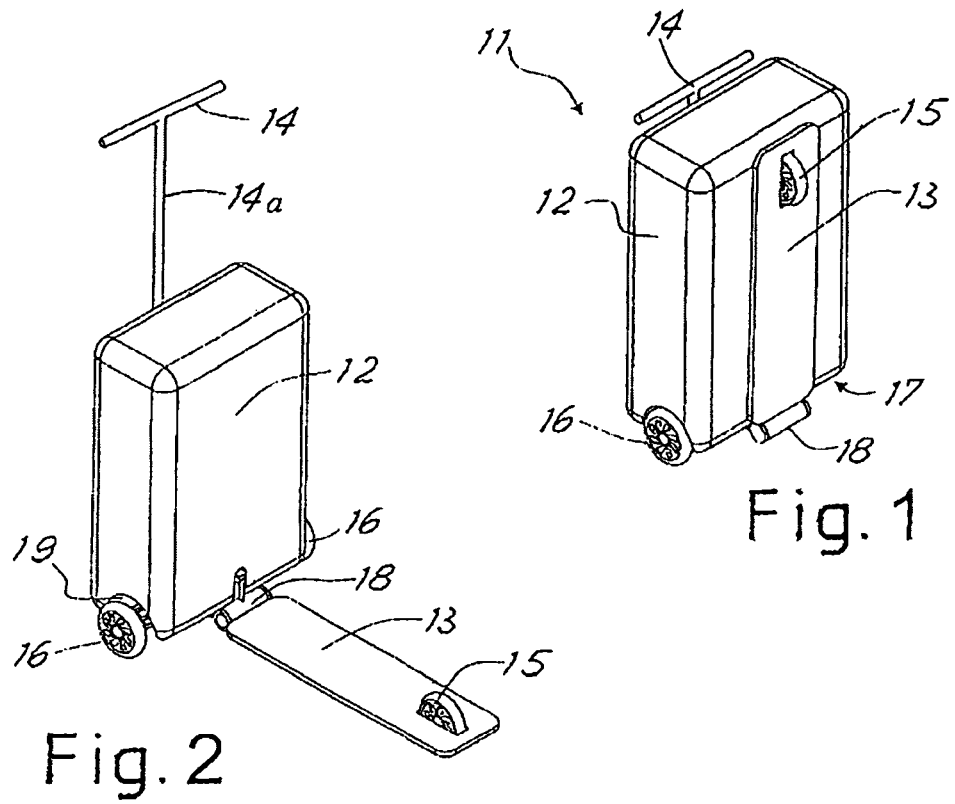
Fig. 1
Fig. 2
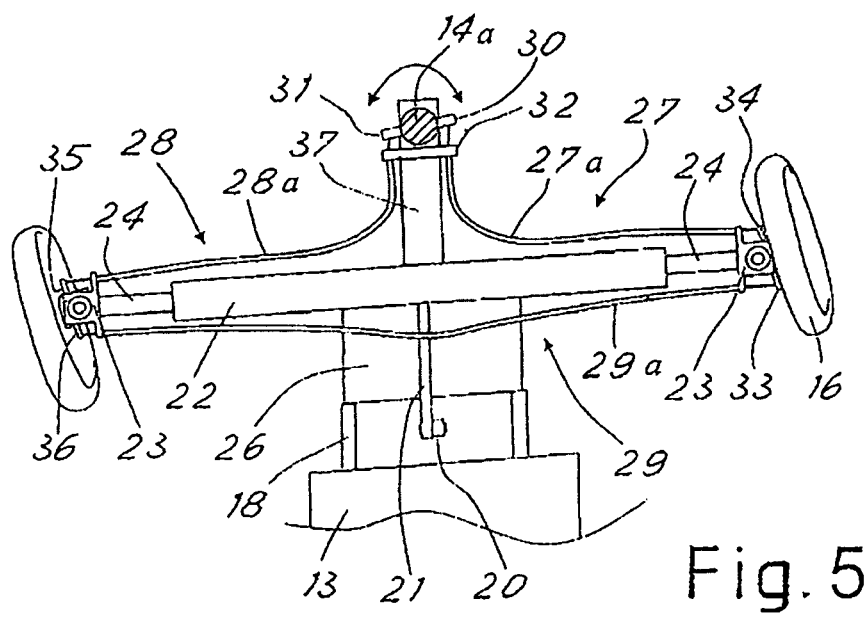
Fig. 5

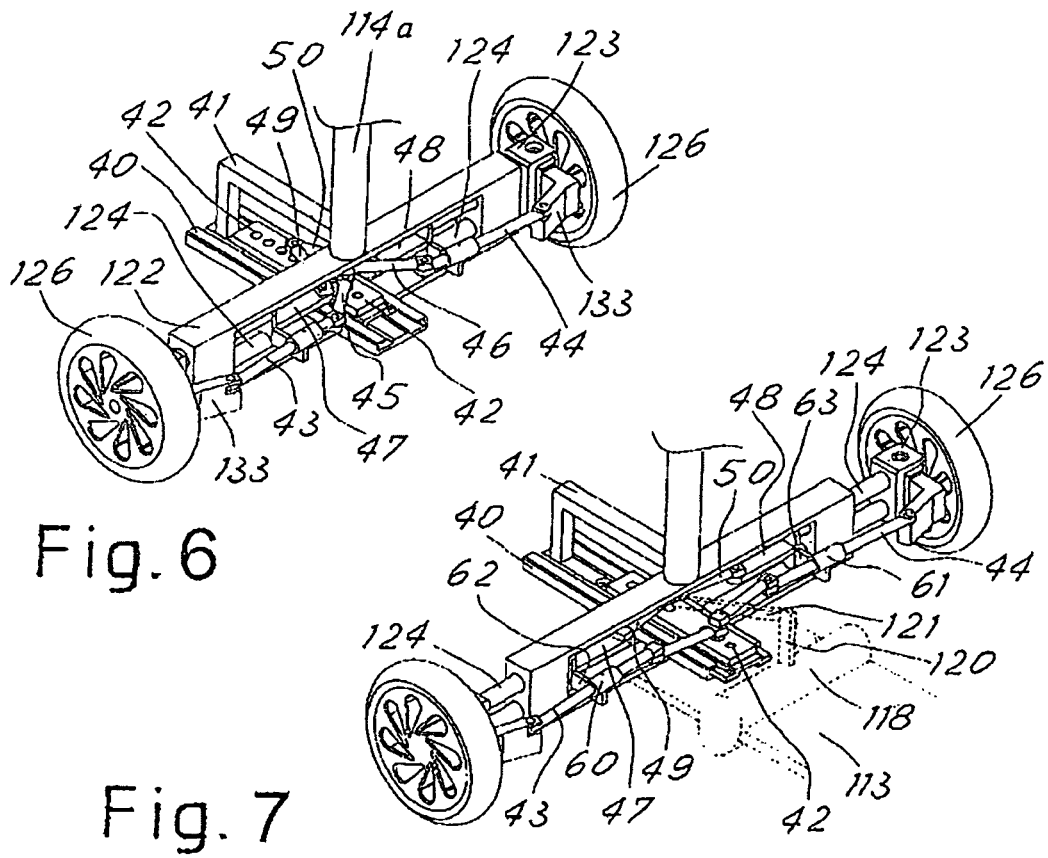
Fig. 6
Fig. 7
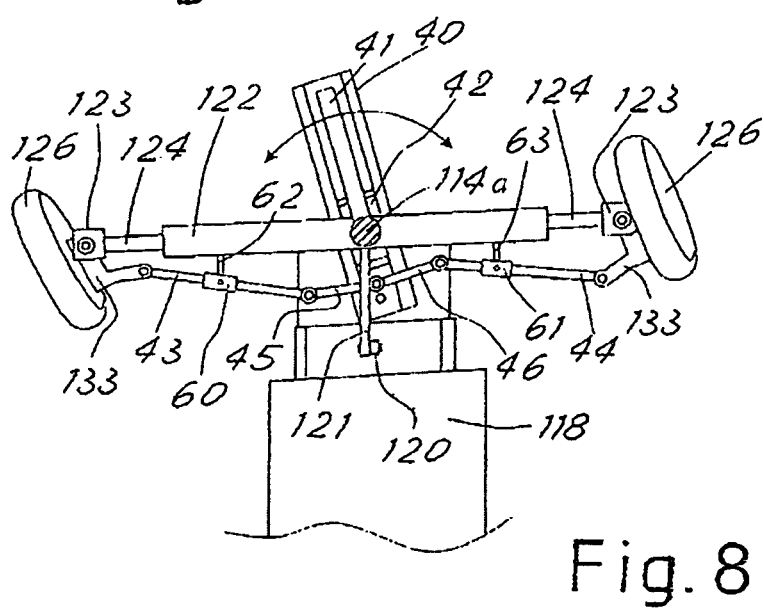
Fig. 8

SUITCASE WITH EXTENSIBLE STEERING WHEELS

BACKGROUND OF THE INVENTION

I. Technical Field

This invention relates to an innovative trolley-type suitcase with extensible steering wheels.

II. Description of the Related Art

A trolley-type suitcase with a pair of wheels on the lower side of the suitcase and an extensible handle on the upper side to pull the suitcase without excessive effort utilizing the rolling of the wheels is known in the art.

Installing a board on the frame of the suitcase which can then be used to convert the suitcase into a scooter is also known. The board is hinged to the suitcase on the side where the wheels are installed and is rotatable between a rest position in which it adheres to one face of the suitcase and a position projecting from the suitcase to support a person. The board is provided with a wheel at its end far from the suitcase and the user can mount thereon, holding onto the handlebar, and can travel as on a scooter. But in products of the known art it may prove difficult to control the direction while traveling holding onto the board in scooter configuration.

Direction control steering systems have been proposed that require significant space to be occupied, such that the capacity of the suitcase is unacceptably reduced.

In addition, known steering systems have a complicated and costly structure.

NL 1018053 C discloses a suitcase according to the preamble of claim 1.

SUMMARY OF THE INVENTION

The general purpose of the present invention is to remedy the above mentioned shortcomings by making available a trolley-type suitcase convertible into a scooter provided with an effective and not cumbersome steering system.

Another purpose of this invention is to make available a suitcase with steering wheels simple and economical in structure.

In view of this purpose it was sought to realize in accordance with the present invention a suitcase as defined in claim 1.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles.

In the drawings:

FIG. 1 shows a view of a suitcase in accordance with an embodiment of this invention;

FIG. 2 shows a second view of the suitcase of the above figure in scooter configuration;

FIG. 5 shows a plan view of the steering system in accordance with the embodiment of the above figures;

FIG. 6 shows a perspective view of the steering unit in accordance with an alternative embodiment of this invention with the scooter board removed and the steering wheels in retracted position;

FIG. 7 shows a view similar to the above with the steering wheels in projecting operative position and the scooter board shown diagrammatically in broken lines;

FIG. 8 shows a plan view of the steering system in the alternative embodiment of FIGS. 6 and 7.

DETAILED DESCRIPTION OF THE INVENTION

Figure 3:
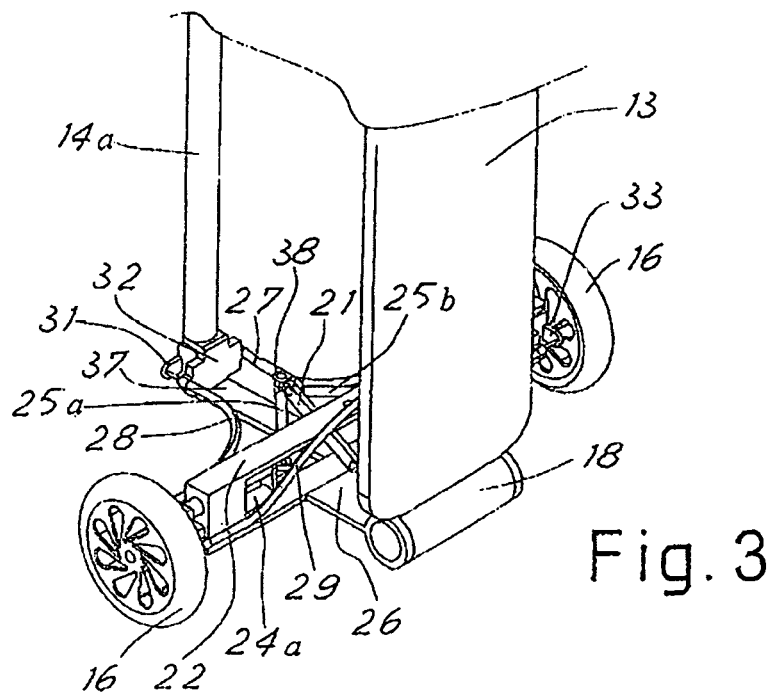
FIG. 3 shows in detail a view of the kinematic mechanism for extension of the steering wheels in a configuration with retracted wheels.

With reference to the FIGS from 1 to 5, a first embodiment is shown of a suitcase 11 in accordance with this invention.

The suitcase 11 is provided with a body 12 which includes the container of the suitcase and a board 13 and a handlebar 14 that is preferably extendible.

The body of the suitcase 12 is nearly parallelepiped and has a pair of steering wheels 16 at one of its lower sides 17. The wheels are arranged on opposite sides of the suitcase and have the axis oriented along the lower side 17 of the suitcase. The handlebar 14 can be removed from the suitcase body 12 on the upper side opposite the wheels 16 as shown in FIG. 2.

The board 13 is constrained at the side 17 with hinging 18 parallel to the axis of the steering wheels 16. The board 13 is provided with a free wheel 15 near its end far from the hinging 18 and is rotatable between a rest position in 5 which it is adherent to a face of the suitcase body (FIG. 1) and a position in which it projects from the body 12 (FIG. 2) advantageously basically perpendicular to the more extended face of the suitcase.

The board 13 is suited to holding a user of the suitcase when in the projecting position of FIG. 2 and locking means can be provided which keep the board fastened in the operative position in relation to the body of the suitcase 12. These locking means can be realized in accordance with any known art and therefore are not further described.

The wheels 16 are movable between a retracted position drawn near the body of the suitcase (FIG. 1) and a position projecting from the body (FIG. 2) in which they can steer. In the retracted position of FIG. 1 the wheels 16 are received at recesses 19 on the opposite sides of the body of the suitcase 12.

The handlebar 14 has the form of the letter T with a telescoping rod 14a which is oriented nearly perpendicularly to the board 13 when the board is in the operative position projecting from the body 12.

The steering of the wheels 16 is controlled through the handlebar 14 with there being a kinematic steering connection which connects the handlebar and wheels.

Advantageously between the board 13 and the steering wheels 16 there is a second kinematic connection such that when the board is brought from the rest position to the operative position projecting from the body of the suitcase 12 the wheels pass from the retracted position brought near the body 12 to the extended position 5 projecting from the body 12.

Figure 4:
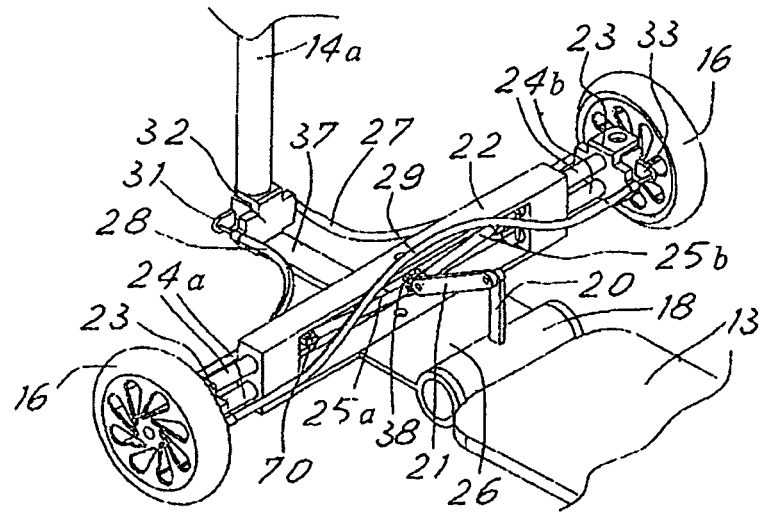
FIG. 4 shows a view similar to the above with the steering wheels in projecting position.

FIGS. 3 to 5 show in detail an embodiment of the steering system and of the kinematic connection for extension of the wheels 16 upon lowering of the board 13.

The suitcase 11 includes a frame 22 designed to be fastened to the body of the suitcase 12 (not shown in FIG. 3) on which a pair of supports 23 of the wheels 16 can run.

The supports 23 are fastened on rods 24a, 24b which are received in guide holes made on opposite sides of the frame 22. Advantageously, for each support 23 two running rods 24a, 24b are provided.

On the supports 23 are hinged the axes of the wheels 16 which can rotate around a vertical axis when they are in the extended position.

The frame 22 forms a lengthened nearly rectangular framed structure arranged parallel to the lower side 17 of the suitcase body with the rods 24a, 24b which run in holes arranged on the opposite short sides of the frame 22.

At the end turned toward the inside of the frame 22 the rods 24a are connected together through a body which is constrained with vertical hinging 70 to the rod 25a (see FIG. 4). Similarly, the rods 24b are connected together by a body hinged to the rod 25b.

The two rods 25a and 25b are arranged in series, being hinged together at the ends opposite those constrained to the rods 24a and 24b.

At the hinging point between the two rods 25a, 25b a small block 38 is constrained which in turn is hinged to the operating part 21 which serves to transmit motion to the 5 supports 23 by the rods 25a, 25b when the board 13 is rotated.

The operating part 21 is advantageously formed with a rod 21 constrained at one end to the block 38 and at the opposite end to the arm 20 which is integral with the board 13.

The board 13 is constrained through horizontal hinging 18 to shelf 26 which is fixed to the frame 22. The arm 20 is fixed to the portion of hinging 18 integral with the board 13.

When the board is in the raised position (FIG. 3) the rod 21 is pushed in withdrawing from the hinging 18 by means of the arm 20 and takes the rods 25a, 25b to be inclined to the running direction of the supports 23. In this condition the wheels are in the retracted position near to the frame 22 and thus to the body of the suitcase 12.

When the board is in the lowered operative position (FIG. 4) the rods 25a, 25b are pulled by the rod 21 until they are aligned with the rods 24 and the wheels are in the position withdrawn from the frame 22.

The rod 14a of the handlebar serves to control the steering of the wheels 16 and is installed in a turning manner on a part 37 fastened to the frame 22 from a side opposite the hinging 18 of the board 13.

It was found particularly advantageous to realize the steering system using Bowden cables.

As shown well in the plan view of FIG. 5 the kinematic steering connection includes 3 Bowden cables. A first cable 27 is connected between the rod 14a of the handlebar and the right wheel 16 and a second cable 28 between the 5 rod 14a and the left wheel 16 while a third cable 29 is connected between the two wheels 16.

In particular the cables 27, 28 are constrained at one end on opposite sides of the rod 14a at the radial flanges 30, 31. The cables 27, 29 are constrained at one end to opposite flanges 33 and 34 projecting from a body integral with the axis of the right wheel 16 and hinged to the support 23. The cables 28 and 29 are constrained on opposing flanges 35, 36 projecting from a body which bears the axis of the left wheel 16.

The outer sheath 27a of the cable 27 is fastened between the body 32 projecting vertically from the part 37 and a side flange of the support 23 associated with the right wheel. The outer sheath 28a of the Bowden cable 28 is fastened between the body 32 and a side flange of the support 23 associated with the left wheel. The cable 29 has the outer sheath 29a fastened between the side flanges of the supports 23 of the two wheels 16.

Rotating the handlebar 14 leftward, the cable 27 goes into traction and pulls the right wheel as shown in FIG. 5.

Rotation of the right wheel imposes through the cable 29 a concordant rotation of the left wheel. When steering leftward, the kinematic connection formed by the Bowden cables acts with contrary direction.

The wheels 16 can steer when the board 13 is in the lowered position and the wheels are taken into extended position. But when the board is in the raised position, the wheels are adherent to the frame 22 and to the body of the suitcase and have no space for turning.

The fact that the wheels are extendible allows avoiding losses of capacity of the suitcase container, it not being necessary to make ample cavities in the suitcase body to receive the wheels with steering capability.

In addition, the stability of the suitcase in scooter configuration is increased with steering wheels more distant from each other.

FIGS from 6 to 8 show an alternative embodiment of the steering system of a suitcase in accordance with this invention.

It must be noted that the kinematic mechanism connecting the board 113 and the wheels 126 to control their side extension is similar to that described for realization of FIGS. 1 to 5.

Even in the alternative embodiment, indeed, there is a frame 122 designed to be fastened in relation to the suitcase body (not shown in the figure) on which can run rods 124 which hold up the supports 123 of the two steering wheels 126.

The rods 124 associated with the left wheel are constrained together at the end turned inward of the frame 122 where they are fastened to the connection part 47. Similarly, the running rods 124 associated with the right wheel are constrained together at their end turned inward of the frame 122 where they are fastened to the connection part 48. The ends of the parts 47 and 48 of the frame 122 turned toward the interior of the frame are connected together through the two rods 49, 50 which are hinged in series as shown in the figure.

At their ends opposite the parts 47, 48 the two rods 49, 50 are hinged to the skate 42 which is installed in a running manner on the guide 40 arranged basically transversal to the frame 122 and rotatable in relation to the latter around a vertical axis as clarified below.

As may be seen in FIGS. 7 and 8 the skate 42 is moved along the guide 40 by means of a rod 121 constrained in an articulated manner to the board 113 by means of the arm 120. The arm 120 as shown can be fastened onto the part of the hinging 118 which is integral with the board 113 similarly to the arm 2 0 described for the above embodiment.

When the board 113 is in the raised position the rod 121 is pushed in advancing in relation to the frame 122 and the skate 42 is made to translate until it reaches the position of FIG. 6 with the rods 49 and 50 bent in relation to the rods 124 and the wheels 126 in the retracted position.

When the board 113 it is in the lowered position (FIGS. 7 and 8), the rod 121 pulls the skate into the withdrawn position with the rods 49 and 50 nearly parallel with 124 and the wheels in the extended position. The kinematic connection designed to realize the extension of the wheels is basically similar to that already described for the above embodiment of FIGS. 1 to 5.

The guide 40 is installed in a revolving manner on the frame 122 in such a manner as to be rotatable around an axis coinciding with the axis of the column 114a of the handlebar and receives the rotating motion of the handlebar through the connection 41 which advantageously acts on the most distant portion of the guide 40 in relation to the frame 122.

With the board 113 lowered, the point of constraint of the rod 121 with the skate 42 lies basically on the rotation axis of the latter and of the handlebar 114a.

The kinematic steering mechanism includes the rods 43 and 45 for the left wheel and the rods 44 and 46 for the right wheel (FIG. 8).

The rods 43, 45 are connected in series by hingings between the body 133 which bears the axis of the wheel 126 left and the skate 42. The rods 44 and 46 similarly constrain the body 133 integral with the axis of the right wheel 126 and the skate 42.

The rod 43 is further constrained to maintain a predetermined distance from the frame 122 opposite the sleeve 60 which is installed in such a manner as to be rotatable around a vertical axis on a support 62 integral with the rods 124 associated with the left wheel 126. In steering, the rod 43 can run inside the sleeve 60.

Similarly, the rod 44 is constrained at the sleeve 61 installed in revolving manner on the support 63 integral with the rods 124 associated with the right wheel.

The rods 43 and 44 are constrained to the bodies 133 with appropriate distance from the vertical hinging axis of the latter to the supports 123 in such a manner as to ensure the necessary rotations of the wheels when the skate 42 is rotated as shown in FIG. 8.

When the board is in lowered position the rods 45 and 46 are in position nearly aligned with the rods 43 and 44. Acting on the handlebar 114a, the wheels 126 are steered with the skate 42 held in withdrawn position by means of the rod 121.

When the board is in raised position, the rods 45 and 46 are bent in relation to the rods 43, 44 (see FIG. 6) with the wheels 126 in the retracted position drawn near to the frame 122.

Figure 9:
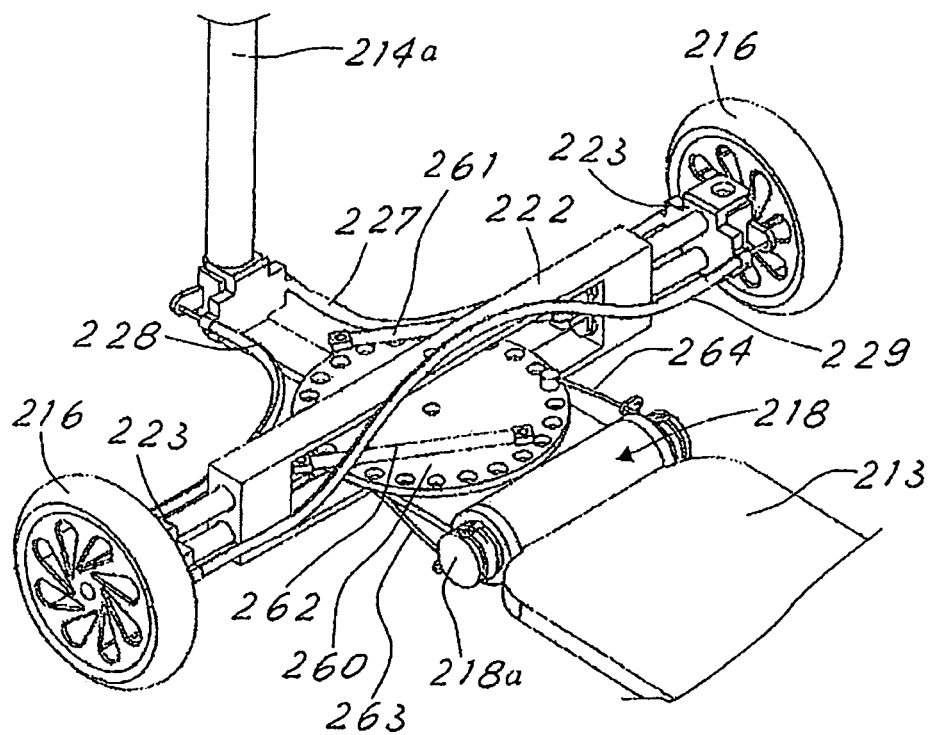
FIG. 9 shows a perspective view of a third embodiment of this invention with steering having Bowden cables and a different mechanism for extension of the steering wheels.

FIG. 9 shows a third realization of this invention provided with a steering system identical to that of FIGS. 1 to 5 but with a different mechanism for extension of the wheels. The steering parts are indicated by reference numbers corresponding to those used for the first embodiment increased by 200.

The extension mechanism for the steering wheels 216 includes a wheel 260 constrained in a revolving manner to the frame 222 and lying in a plane parallel to that of the board 213 in operative position. On opposite sides of wheel 260 are applied two tie-rods 263 and 264 which are fastened at opposite ends to the pin 218a of the hinging 218 integral with the board 213.

The tie rods 263 and 264 are wound on the pin 218a with windings in opposite direction in such a manner that when the board is lowered the wheel 260 is pulled by the tie rod 264 and rotates clockwise seen from above while when the board 213 is raised the wheel 260 is pulled by the tie rod 263 and rotates counterclockwise.

On the wheel 260 are hinged two rods 261 and 262 on opposite sides of the wheel in relation to a direction transversal to the running direction of the supports 223 of the wheels. The rods 261 and 262 are hinged to the opposite end of the running rods which hold up the supports 223 of the steering wheels 216.

The rods 261 and 262 convert the rotary motion of the wheel 260 into a translation of the supports 223 respectively in extension or retraction depending on whether the wheel 260 turns clockwise or counter clockwise. In this manner with board 213 lowered the wheels 216 are in the extended position while with board 213 raised the wheels 216 are in the retracted position.

The cables 262 and 263 could if necessary be guided into some point or be realized with Bowden cables.

It is now clear that the preset purposes have been achieved.

Indeed, a system of extensible steering wheels is made available allowing saving precious space inside the suitcase as it is not necessary to provide voluminous cavities in the body of the suitcase to allow rotation of the wheels during steering.

In addition, a light, effective and economical system is made available for realization of the steering. The suitcase in scooter configuration has also improved stability due to the greater distance between the wheels.

Naturally the above description of an embodiment applying the innovative principles of the present invention is given by way of non-limiting example of said principles within the scope of the exclusive right claimed here.

For example, an electric motor could be applied in the suitcase connected to the steering wheels to drive them in rotation.

In addition, the steering wheels could be provided with a brake controllable by the handlebar grips.

In the figures shown, the steering handlebar rod and the board are installed on opposite sides of the suitcase but it is understood that the handlebar could also be installed on the same side to which the board is hinged.

The invention claimed is:

1. A suitcase comprising:
   a suitcase body having a first side and a second side, the second side being opposite the first side;
   a pair of steering wheels installed at the first side of the suitcase body, the steering wheels being movable between a retracted position adjacent the suitcase body and an extended position projecting laterally from the suitcase body;
   a handlebar projecting from the suitcase body on the second side;
   a board movable between a rest position drawn near the suitcase body and an operative position projecting from the suitcase body, when in the operative condition, the board is arranged to hold up a user for steering the steering wheels;
   a first kinematic connection between the handlebar and the steering wheels to control the steering; and
   a second kinematic connection between the board and the steering wheels, wherein the steering wheels are moved between the extended position as the board is pivoted into the operative position projecting from the suitcase body, and the retracted position as the board is pivoted into a rest position.

2. The suitcase in accordance with claim 1, wherein the steering wheels in the retracted position are received in seats in the suitcase body.

3. The suitcase in accordance with claim 1, wherein the handlebar is configured to be slipped out of the suitcase body to be put in an operative position.

4. The suitcase in accordance with claim 1, wherein the board is pivotable between the rest position and the operative position projecting from the suitcase body and hinged to the suitcase body at the first side.

5. The suitcase in accordance with claim 1, comprising supports on which axes of the steering wheels are hinged so that the steering wheels are rotatable around a vertical axis in the extended position, a frame, wherein the supports are arranged at opposite sides of the frame and so as to be movable relative to the frame, first and second rods hinged to each other in series and connecting the supports with each other, and a driving part coupled to a hinging point between the first and second rods and connected in turn to the board so that the driving part is capable of moving the hinging point between the first and second rods in a direction transverse to a running direction of the steering wheels when the board is moved between the operative position and the rest position.

6. The suitcase in accordance with claim 1, comprising a third rod hinged to an arm connected with the board and projecting therefrom in a direction transverse thereto.

7. The suitcase in accordance with claim 1, wherein the handlebar includes a telescopic rod nearly orthogonal to the axis of the steering wheels.

8. The suitcase in accordance with claim 1, wherein the first kinematic connection between the handlebar and the steering wheels includes Bowden cables.

9. The suitcase in accordance with claim 8, wherein the Bowden cables are one of first and second Bowden cables, the first Bowden cable being connected between a rod of the handlebar and one of the two steering wheels, the second Bowden cable being connected between the rod of the handlebar and the other of the two steering wheels, and a third Bowden cable connected between the two steering wheels, wherein the first and second Bowden cables are connected on opposite flanks of the handlebar and ends of the Bowden cables connected to the steering wheels are connected for each wheel to opposing flanges projecting from a body integral with the axis of the steering wheel and hinged to a support.

10. The suitcase in accordance with claim 8 wherein the Bowden cables comprise an external sheath which is fastened to supports of the wheels.

11. The suitcase in accordance with claim 1 wherein the first kinematic connection includes a combination of rods and hingings.

12. The suitcase in accordance with claim 11, comprising a frame, wherein for each wheel the first kinematic connection includes rods which are connected in series by hinging between a body integral with the axis of the steering wheel and a skate running transversally to the axis of the steering wheels on a guide hinged to the frame and connected with the handlebar, wherein the skate is connected to the board and is configured to be moved along the guide so that the rods are substantially aligned with the board in the operative position with the rod nearest the steering wheel which is constrained to have a certain distance from the frame being able to run inside of a sleeve constrained to the frame.

13. The suitcase in accordance with claim 12 wherein the sleeve is hinged for each steering wheel to a support connected with a respective support of the wheel.

14. The suitcase in accordance with claim 12 wherein on the skate are hinged rods configured to move the supports of the wheels between a first position with the steering wheels in the retracted position and the steering wheels in the extended position.

15. The suitcase in accordance with claim 12 wherein the skate is constrained to the board by a rod hinged to an arm connected with the board projecting transversely therefrom.

16. The suitcase in accordance with claim 1 wherein the second kinematic connection includes a combination of tie rods.

17. The suitcase in accordance with claim 1, comprising supports on which the steering wheels are disposed, a frame wherein the supports are arranged at opposite sides of the frame so as to be movable relative to the frame, a wheel arranged on the frame in a rotatable manner, a pair of hinging rods connecting the supports with the wheel and hinged on opposite sides of the wheel so that the hinging rods are capable of converting the rotary motion of the wheel into a translation of the supports resulting in an extension or refraction of the steering wheels relative to the frame depending on whether the wheel turns clockwise or counter-clockwise, and a pair of tie rods acting on opposite sides of the wheel and fastened at opposite ends to a pin of a hinging of the board to the frame, wherein the tie rods are wound on the pin in opposite directions relative to each other so that, when the board is lowered, the wheel is pulled by one tie rod of the pair of rods so as to rotate in one direction for extending the steering wheels and, when the board is raised, the wheel is pulled by the other tie rod of the pair of rods so as to rotate in the opposite direction for retracting the steering wheels.

18. The suitcase in accordance with claim 1 wherein the board is provided with a wheel at one end distant from the suitcase body when the board is in the operative position.

* * * * *

UNITED STATES PATENT AND TRADEMARK OFFICE
CERTIFICATE OF CORRECTION

| | | |
|---|---|---|
| PATENT NO. | : 8,469,374 B2 | Page 1 of 1 |
| APPLICATION NO. | : 12/518366 | |
| DATED | : June 25, 2013 | |
| INVENTOR(S) | : Graf von Bismarck | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 863 days.

Signed and Sealed this
Twenty-seventh Day of January, 2015

Michelle K. Lee
*Deputy Director of the United States Patent and Trademark Office*